Patented June 20, 1933

1,914,450

UNITED STATES PATENT OFFICE

PAUL NAWIASKY, OF LUDWIGSHAFEN-ON-THE-RHINE, AND FRITZ HELWERT, OF MANNHEIM, AND ARTUR KRAUSE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DYESTUFF OF THE ANTHRAQUINONE SERIES

No Drawing. Application filed December 5, 1927, Serial No. 237,980, and in Germany December 7, 1926.

According to the German Patent No. 167,461, fusing 1-hydroxyanthraquinone with caustic alkalies furnishes a brownish-yellow condensation product which gives a very sparingly soluble sodium salt with caustic soda solution, and a leuco compound, more readily soluble in alkalies, with sodium hydrosulphite and caustic soda solution. According to Scholl (Berichte der Deutschen Chemischen Gesellschaft, vol. 52, p. 2254) this compound is 1.1'-dihydroxy-2.2'-dianthraquinonyl.

We have now found that the leuco compound of this product is readily soluble in very dilute alkalies or in ammonia, and that this solution has a strong tinctorial effect on animal, vegetable and artificial fibres. On exposure to the air, the yellow-brown dyeings turn to a beautiful yellow. It is of particular importance that, in dyeing wool from the faintly alkaline vat, a yellow shade is obtained, the beauty and fastness of which have not hitherto been attainable with other vat dyestuffs.

We have also found that particularly beautiful and fast dyeings are obtained, when the dyestuff has previously been purified. This can be effected by eliminating small quantities of impurities by fractionally precipitating the product from its solution in sulphuric acid.

The purification can, however, be effected in a much simpler manner in practice, by treating the crude product with oxidizing agents, as for example by heating the pastes, furnished by the process of production, with hypochlorites, permanganates or the like. The treatment with oxidizing agents may also be carried out in addition to the aforesaid purification by fractional precipitation from a solution in sulphuric acid.

Particularly good yields of pure dyestuff are obtained, if the purification with oxidizing agents and the separation of the dyestuff from solutions of its leuco compounds be effected in one operation. This may, for example, be done by dissolving the melt, obtained by fusing 1-hydroxyanthraquinone or one of its derivatives with caustic alkali until the reaction is complete, in water and treating the solution thus obtained directly with an oxidizing agent.

We have also found that the formation of the dyestuff, which proceeds rather incompletely, when working in accordance to the process of the said German Patent 167,461, proceeds far more smoothly and with much better yields, when the alkali melt is carried out in the presence of organic dispersion media which may be solvents or suspension media, and that at the same time the compound is obtained in a higher state of purity. Alcohol and aniline may be mentioned as suitable agents, for this purpose. This process may also be applied, with advantage, to derivatives of 1-hydroxy-anthraquinone, whereby compounds result, some of which are new. The dyestuffs obtained from the derivatives of 1-hydroxy-anthraquinone are dyed in the manner above described from the faintly alkaline vat. A particularly advantageous method of working is to carry out the reaction with the exclusion of oxygen, as for example in an atmosphere of nitrogen. In this case, the products are first obtained in the form of their hydrocompounds, and for the most part are not precipitated until subjected to an air blast. Small quantities of impurities can be eliminated, in the manner described above, by fractional precipitation of the crude products from solutions in sulfuric acid, or preferably by treatment with oxidizing agents.

The following examples will further illustrate the nature of the said invention, but the invention is not limited to the examples. The parts are by weight.

Example 1

960 parts of caustic alkali and 800 parts of alcohol are heated to 160° C., while stirring, the surplus alcohol distilling over. 240 parts of 1-hydroxyanthraquinone are then added, and the whole is stirred at the same temperature for 3 hours, access of air being prevented as far as possible, as for example by passing a current of nitrogen slowly over the reaction mixture. While still warm the melt is run into a large volume of water, and air is passed through the solution until the amount of precipitate ceases to increase. After filtering and washing until the filtrate runs away clear, the precipitate is acidified with dilute mineral acids and freed from saline substances. The yield is approximately quantitative. For the purpose of purification, the compound may be dissolved in 10 parts of sulfuric acid monohydrate, 50 parts of 50° Bé. sulfuric acid being then run in, without cooling, while actively stirring. Even when warm, the greater part of the compound separates in crystalline form. It is filtered by suction, washed with 62° Bé. sulfuric acid, and finished in the usual manner. Applied in accordance with the above described process the resulting compound dyes wool pure yellow shades from the vat.

Example 2

300 parts of aniline are heated to 160° C., 60 parts of powdered caustic potash, followed by 30 parts 1-hydroxy-anthraquinone, are then added, oxygen being, as far as possible, excluded. The temperature is next raised to the boiling point of aniline, and the mixture is stirred for 4 hours at that temperature. After cooling and filtering by suction, the aniline is expelled, as for example by distillation with steam, and the residue is further treated as described in Example 1.

Example 3

5 parts of the crude dyestuff obtainable according to Example 1 are heated in a finely distributed condition in 100 parts of water, to 90° to 95° C. About 30 parts of a solution of hypochlorite, containing 12 per cent of active chlorine, are gradually added, by drops, during from 1 to 1½ hours, the same temperature being maintained. When the suspension ceases to become any lighter in color, the purification is complete. After treatment in the usual manner, the dyestuff produces very pure yellow shades on wool from the vat.

Example 4

5 parts of the crude dyestuff employed in Example 3 are heated to boiling with 50 parts of water, and 10 parts of potassium permanganate are added in small portions, while actively stirring, during a period of about half an hour. Boiling is continued for another hour, the manganese dioxide formed being then decomposed by boiling with bisulphite. After filtration, the saline substances are eliminated from the precipitate, as for example by boiling with dilute mineral acid. The resulting yellow paste gives dyeings which are equally as pure as those produced by the dyestuff obtained according to Example 3.

Example 5

1000 to 1500 parts of a hypochlorite solution containing 12 per cent of active chlorine are allowed to flow slowly at 50° C. into a solution of the melt, obtainable according to Example 1, in 15000 parts of water. When all the chlorine has been used up, the suspension of the alkali metal salt of the dyestuff thus obtained is heated to boiling, and the dyestuff itself recovered in a pure state by acidifying, filtering and washing. The dyestuff dyes wool from the vat in very pure yellow shades.

Example 6

160 parts of potassium hydroxid are heated together with 140 parts of alcohol to 150° C. with stirring, the excess of alcohol being distilled off. 40 parts of 1-hydroxy-4-aminoanthraquinone are added to the mixture at this temperature, a current of nitrogen being passed through. The temperature rises to about 160° C. and the mixture is maintained at this temperature with continued stirring in a current of nitrogen for three hours. The melt is now poured into water and the dyestuff formed separated out by blowing in air, thereupon filtered and carefully washed out. The dyestuff dyes wool grey from an ammoniacal hydrosulphite vat.

Example 7

30 parts of potassium hydroxide are heated with 25 parts of alcohol with stirring to 150° C. 6 parts of 1-hydroxy-4-methoxyanthraquinone are added to the mixture and the temperature maintained at 160° C. for 3 hours with stirring, a current of nitrogen being passed through all the time. The dyestuff is recovered as described in Example 6 and dyes wool brown from the faintly alkaline hydrosulphite vat.

What we claim is:

1. The process for the production of dyestuffs of the anthraquinone series, which comprises fusing 1-hydroxyanthraquinones with caustic alkalies in the presence of organic diluent media in an atmosphere of nitrogen.

2. A process for the production of pure dyestuffs of the anthraquinone series which comprises acting upon a 1-hydroxy-anthraquinone with a caustic alkali in the presence of an organic diluent medium in an atmosphere of nitrogen and treating the crude condensation product thus obtained with an oxidizing agent.

3. A process for the production of pure dyestuffs of the anthraquinone series which comprises acting upon a 1-hydroxy-anthraquinone with potassium hydroxide in the presence of alcohol in an atmosphere of nitrogen and treating an aqueous solution of the crude condensation product thus obtained with a solution of hypochlorite.

4. A process for the production of pure dyestuffs of the anthraquinone series which comprises acting upon a 1-hydroxy-anthraquinone with a caustic alkali in an atmosphere of nitrogen, treating an aqueous solution of the crude condensation product thus obtained with an oxidizing agent and fractionally precipitating the pure product from its solution in sulfuric acid.

5. A process for the production of a pure dyestuff of the anthraquinone series which comprises acting upon 1-hydroxy-4-amino-anthraquinone with potassium hydroxide in the presence of alcohol, in an atmosphere of nitrogen, treating an aqueous solution of the crude condensation product thus obtained with an oxidizing agent and fractionally precipitating the pure product from its solution in sulfuric acid.

6. As a new product the vat dyestuff having probably the following formula:

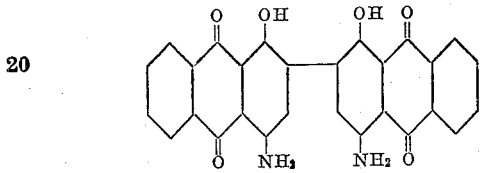

which dyestuff is a dark-gray powder which is difficultly soluble in sulfuric acid, giving a dark violet solution which dyes wool and cotton brown shades from a yellowish-brown vat and which may be obtained by treating 1-hydroxy-4-amino-anthraquinone with caustic alkalies.

In testimony whereof we have hereunto set our hands.

PAUL NAWIASKY.
FRITZ HELWERT.
ARTUR KRAUSE.